(12) United States Patent
Gordy et al.

(10) Patent No.: US 8,387,034 B2
(45) Date of Patent: *Feb. 26, 2013

(54) SYSTEM AND METHOD FOR THE DISTRIBUTION OF A PROGRAM AMONG COOPERATING PROCESSING ELEMENTS

(75) Inventors: Robert Stephen Gordy, Seminole, FL (US); Terry Spitzer, Virginia Beach, VA (US)

(73) Assignee: Management Services Group, Inc., Virignia Beach, VA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/814,882

(22) Filed: Jun. 14, 2010

(65) Prior Publication Data

US 2010/0251223 A1 Sep. 30, 2010

Related U.S. Application Data

(63) Continuation-in-part of application No. 11/313,383, filed on Dec. 21, 2005, now Pat. No. 7,765,536.

(51) Int. Cl.
*G06F 9/45* (2006.01)
(52) U.S. Cl. .................................................. 717/149
(58) Field of Classification Search .................. 717/149; 712/25, 222; 348/473; 345/426, 506; 709/226; 703/17

See application file for complete search history.

(56) References Cited

U.S. PATENT DOCUMENTS

| | | | |
|---|---|---|---|
| 5,021,947 A * | 6/1991 | Campbell et al. | 712/25 |
| 5,347,639 A | 9/1994 | Rechtschaffen | |
| 5,410,696 A * | 4/1995 | Seki et al. | 717/149 |
| 5,768,594 A | 6/1998 | Blelloch | |
| 5,774,728 A | 6/1998 | Breslau | |
| 6,253,371 B1 | 6/2001 | Iwasawa | |
| 6,292,822 B1 | 9/2001 | Hardwick | |
| 6,339,840 B1 | 1/2002 | Kothari | |
| 6,415,286 B1 * | 7/2002 | Passera et al. | 1/1 |
| 2004/0083475 A1 | 4/2004 | Todd | |
| 2004/0230770 A1 | 11/2004 | Odani | |
| 2006/0059473 A1 * | 3/2006 | Moler | 717/149 |
| 2007/0169046 A1 | 7/2007 | Gordy | |

OTHER PUBLICATIONS

Olson et al, "Programming a Pipelined Image Processor", IEEE 1993, p. 93-100 <OlsonPipelined.pdf>.*
Olson et al, "Software for Advanced Vision Systems", Apr. 1995, pp. 1-76 <AdvancedOlson.pdf>.*
Lee et al, "Partitioning and Scheduling for Parallel Image Processing Operations" IEEE 1995, p. 86-90<PartitnSchedul.pdf>.*

* cited by examiner

*Primary Examiner* — Tuan A Vu
(74) *Attorney, Agent, or Firm* — Larson & Larson, P.A.; Frank Liebenow; Justin P. Miller

(57) ABSTRACT

A Veil program analyzes the source code and/or data of an existing sequential target program without user interaction and determines how best to distribute the target program and data among the processing elements of a multi-processing element computing system. The Veil program analyzes source code loops, data sizes and types to prepare a set of distribution attempts or strategies, whereby each strategy is run under a run-time evaluation system and evaluated to determine the optimal decomposition and distribution across the available processing elements.

17 Claims, 10 Drawing Sheets

SYSTEM AND METHOD FOR THE DISTRIBUTION OF A PROGRAM AMONG COOPERATING PROCESSING ELEMENTS

CROSS-REFERENCE TO RELATED APPLICATION

This is a continuation-in-part application to U.S. patent application Ser. No. 11/313,383, filed Dec. 21, 2005, the disclosure of which is herein incorporated by reference.

BACKGROUND

1. Field of the Invention

The present invention is directed to the distribution of operations of a source or binary program among a plurality of cooperating processing elements and more particularly to a system for managing the distribution of operations to transform an existing, legacy, sequential program to a parallel application so that it may use newer multi-core and multi-computer hardware platforms with or without the original program source code. If source code is not available, transformation to a parallel solution does not require modification of the legacy program. Thus, this invention mitigates obsolescence of existing sequential programs through automatic migration to multi-core and multi-computer hardware platforms.

2. Description of the Related Art

In the past four decades, programmers have been writing applications for computers that have progressed from simple, single instruction pointer, linear operation processors to concurrent, multi-processor environments. Current and future computers have multiple processing elements (multiple execution units, multiple cores, multiple processors or combinations of the like). This is partly because the basic CPU clock frequency will soon hit an upper limit due to problems related to the physics of manufacturing silicon-based semiconductors. Since the invention of the microprocessor around 1970, the complexity (e.g., number of transistors) and clock speed of the microprocessor has continually increased. These increases came about by shrinking the size of the individual transistors within the microprocessor, thereby reducing the capacitance across the transistor, allowing them to switch faster, and reducing the delay in signaling among microprocessor components. Over the last few years there has been asymmetrical development in the microprocessor. Specifically, the historical doubling of clock speed has not continued over the last few silicon generations. Instead, advanced fabrication techniques provide vast transistor budgets for the chip designer. This has led manufacturers to develop microprocessors that have multiple execution units (processing elements) to perform faster multiple tasks in parallel, thereby improving the execution performance of a program at the same or similar clock speeds. The newer generation of processors has separate discrete processing elements that cooperate to execute a program. One such type of multi-core processor is known as a cell-based processor, in which the processing system is comprised of eight independent processing elements or cells that communicate with a ninth head processor and accept or pass tasks and results to each other through direct memory access (DMA).

Programming languages have also progressed at a rapid rate. In the early years, computers were programmed using panels of wire jumpers or by programming the computer in its machine language. Assemblers were created allowing programmers to program the computer with programs stored on, for example, paper tape, and written in assembly language. The assemblers would then convert programs into the machine language for execution. Soon, higher level languages such as FORTRAN, PL/1, and C further removed the programmer from having to know and understand the underlying hardware. Furthermore, specialized languages for specific tasks such as PERL, LISP, and SIMSCRIPT were created to handle processing needs for certain disciplines such as system administration, artificial intelligence, and simulation/modeling respectively. High level languages are designed to abstract the underlying hardware so that the programmer need not be concerned with the overall architecture of the processing system that will run the resulting executable. Furthermore, high level languages are designed so that the source code can be re-compiled and execute on totally different architectures with slight or no changes needed to the source code. This feature makes for portable code, but the ability of the high-level language compilers to optimize the resulting executable program is minimal. Compilers for a given processor architecture may optimize a program by selecting optimal instructions, allocating registers, performing compiler techniques such as loop unrolling and the like. This optimization helps in single processing environments, but falls short in multiple processing environments because the program needs to be divided in a balanced way across several processing elements so that each processing element completes its respective operations in parallel and finishes its task at approximately the same time, thereby not slowing the combined operation down by the slowest link.

Attempts have been made to port existing languages to multiple processor computing systems. To date, these require programmer intervention, in that the programmer needs to understand the underlying processor architecture and direct the program operation onto the various processing elements. This is analogous to the programmer going back to write machine language or assembly language programs, whereby the programmer must understand the underlying architecture idiosyncratic details and the program is designed to operate exclusively on that architecture. An example of this is SETI (Search for Extra Terrestrial Intelligence), wherein the program is divided into multiple executables enabled for independent execution on most any personal computer. A small subsection of data and the program is transferred to a "volunteer" personal computer where the program is executed when the personal computer is idle, such as when the screen saver is operating. In this type of application, many processors are performing similar tasks on different slices of a dataset. In this example, a programmer or team designs the program to operate on a pool of clients of a specific architecture such as an industry standard personal computer running one of the Windows® operating systems. The programmer or team of programmers must determine how to sub-divide the program for operation over the pool of processors or processing elements and must design a front-end that will accept data (in SETI—data from deep-space radio receivers), sub-divide the data, find an available client, transfer the data to the client, wait for the result and combine the results.

Another limitation of using compilers to distribute a program among multiple processors is that the compiler only evaluates one high level language statement at a time and, for example, dispatching expressions in the a given statement among the multiple processors. Unfortunately, experience has demonstrated that invoking parallelism at such a fine granularity leads to excessive communication overhead compared to the amount of parallel computation achieved.

Another need is a system that evaluates the program and data as a whole which balances communication/computation tradeoffs before a parallel program decomposition is attempted.

Some programs developed to solve complex problems in fields such as biotechnology or radar analysis require a programmer write an application that performs many independent, yet differing operations. The program may run on a supercomputer comprised of a plurality of processing elements. In some architectures, the processing elements are homogeneous, for example, cell-based architectures. In other architectures, the processing elements are heterogeneous, for example, dedicated super computers having specialized processing elements to perform specific tasks such as Fast-Fourier Transforms. Each operation requires differing resources, thereby requiring the programmer to understand the resource needs of the program as well as the capabilities of various processing units within the supercomputing architecture. Presently, the task of creating software for these architectures requires the programmer to understand the application and the architecture and write specific code to match both. Since this code is specific the target computer system or supercomputer, it is generally difficult to port the program to a different architecture without major redesign. This is analogous to the early years of computers where the programmer had to understand and use the basic machine code of each processor on which they wrote programs. In each of these architectures, a target program, for example a data compression program, must be written and designed for the specific architecture. So being, a target program that compresses video data to fit on a certain media (e.g., Digital Versatile Disk or DVD) would be written by a programmer who understands the architecture and divides the target program's steps among the various processing elements. For example, several processing elements may be assigned to compress a block of video while another processing element may be assigned to decompress that block to feed back error coefficients to the compression steps. Once developed and debugged, the target program may run fine on the target architecture, but when the target architecture becomes obsolete and must be updated to a new architecture, the programmer must re-write much of the target application, porting it to the new architecture.

What is needed is a system that will analyze programs for operation on multiple processing elements and transform the program automatically onto those processing elements for optimal operation, freeing the programmer from becoming an expert regarding the hardware platform.

SUMMARY OF THE INVENTION

The present invention includes a system for decomposing a sequential target program for operation in a multiple processing element computing system according to each of a variety of strategies, measuring the performance of the target program with each strategy and selecting the best performing strategy, thereby selecting the best strategy for running the target program on the specific computer system.

In one embodiment, a system that automatically decomposes an existing sequential program into one or more distributed programs that execute on multiple-processing elements of a computing system is disclosed. Decomposition is performed without the knowledge of a user and without source code. The system includes a computer system with multiple processing elements (either a shared-memory tightly coupled multiple core microprocessor die or loosely coupled multiple processors, each having one or more cores or execution units) and a target program written to run on the computer system. A Veil program runs on the computer system to (a) wrap or encapsulate the target program with a run-time analyzer, then (b) select one strategy from a plurality of strategies and (c) decompose/parallelize the target program according to the selected strategy. (d) The target program is then executed and (e) execution results are recorded. (f) If there are further strategies in the plurality of strategies, steps a-f are repeated, selecting the next strategy. The execution results from each test are compared and the best strategy is selected. Thus, the best strategy is then used to transform the target application into a parallel application.

In another embodiment, computer implemented method for decomposing and distributing a target program onto a plurality of processing elements (either a single processor with multiple cores or execution units or multiple processors, each having one or more cores or execution units) without user intervention is disclosed. The target program is sequential. The method includes (a) wrapping or encapsulating the target program with a run-time analyzer; (b) selecting one strategy from a plurality of strategies and (c) decomposing and parallelizing the target program according to the one strategy; (d) executing the target program on the plurality of processors and (e) recording execution results; and (f) if there are further strategies in the plurality of strategies, changing the one strategy to a next strategy from the plurality of strategies and repeating steps a-f.

In another embodiment, a system for optimizing the operation of a program in a multiple-processing element computing system is disclosed including a computer system with multiple processing elements (either a single processor with multiple cores or execution units or multiple processors, each having one or more cores or execution units) and a target program written to run on the computer system. Included is a way to wrap the target program with a run-time analyzer means and a way to select one strategy from a plurality of strategies. The target program is decomposed and parallelized according to the one strategy and executed and execution results are recorded. If there are further strategies in the plurality of strategies, the one strategy is set to a next strategy from the plurality of strategies the above is repeated. When no more strategies remain in the plurality of strategies, the execution results are compared and the target application is parallelized using the best strategy having a best execution time.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
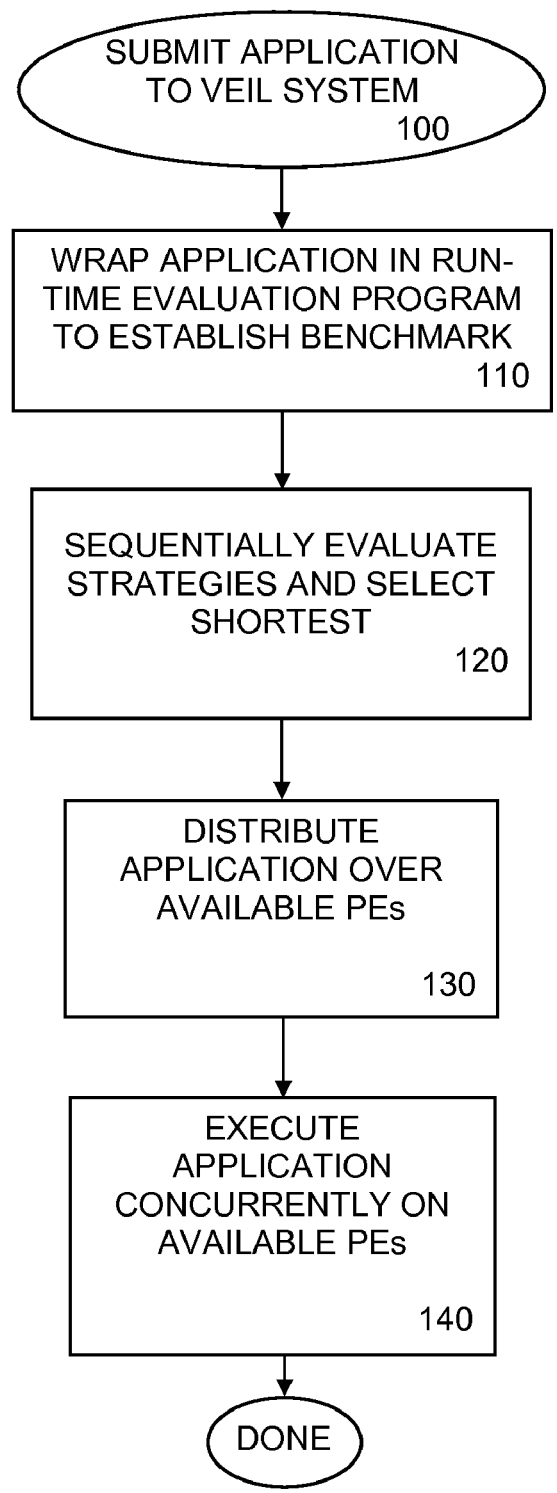
FIG. 1 illustrates a flow chart of the overall system of the present invention.

Reference will now be made in detail to the presently preferred embodiments of the invention, examples of which are illustrated in the accompanying drawings. Throughout the following detailed description, the same reference numerals refer to the same elements in all figures.

Throughout this description, "distribution" and "parallelization/distribution" represent similar constructs. Both indicate decomposing a target program over either a tightly-coupled system with processors sharing a common memory address space or decomposing a target program over a loosely-coupled system with processors having independent memory address spaces. The system and methods decompose over both tightly and loosely coupled systems.

Referring to FIG. 1, the flow of the overall system of a first embodiment of the present invention is shown. The Veil (cover) system provides for compilation and run-time operation of a program over a pool of processors. The Veil system, in general, analyzes the program in light of the target configuration and spreads the resulting execution over the processing elements of the target configuration based upon a configuration profile. The Veil system analyzes the program and associated datasets to determine the optimal division of the program and data across the target configuration. For example, a given program and dataset may be divided and distributed differently on a configuration having 32 symmetrical processing elements (PEs) than on a configuration having 16 symmetrical processing elements (PEs) and 4 specialized processing elements (PEs).

The system starts with a program (an application) submitted to the Veil system 100 either in object/executable form or in source form. The first step is to wrap the program with a run-time evaluation program 110, which embeds measurement tools into the application to measure/read and record statistics related various aspects of performance, for example, the volume of input/output, the distribution of input/output bursts, virtual memory paging load, swapped memory load, network load, input/output device load, run queue length for each processing element, runtime profiles of other processes and types of input/output operations requested by the target program. The run-time analyzer or evaluation program 110 also reads and records operating system parameters such as amount of free storage space, storage read/write speed, file protections, file creation limits, and files accessed by the target program.

Next, the system sequentially applies a set of strategies and selects the strategy that performs the best 120, e.g., the shortest execution time (this is described in detail in the description of FIG. 2), detecting program iterations, detecting recursions, detecting a locality of memory references, detecting regularity of memory references, and processor heterogeneity. Once selected, the Veil system distributes the application over the available processing elements 130 and the application is executed concurrently on the available processing elements 140.

Figure 2:
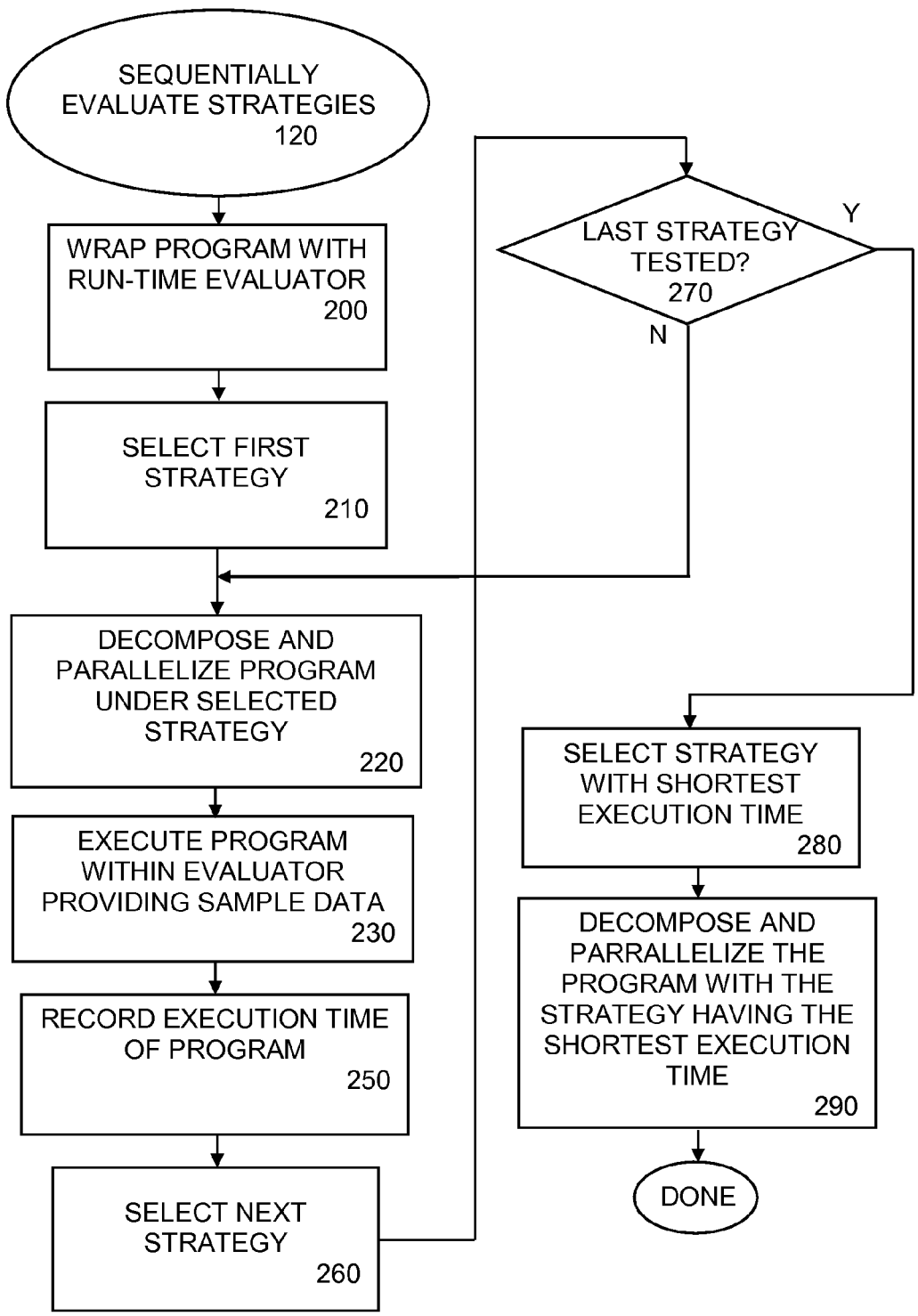
FIG. 2 illustrates a flow chart of the target program analysis of the present invention.

Referring to FIG. 2, the flow of the sequentially testing of the strategies as in step 120 above of the first embodiment of the present invention is described. As in FIG. 1, the first step is to wrap the program with a run-time evaluation program 200, which embeds measurement tools into the application to monitor various aspects of performance, for example, the type of I/O operations requested, the number of files accessed, I/O read versus write patterns, or the amount of time a particular code segment takes to execute. Next, a strategy is selected 210 and the program is divided or parallelized under that strategy 220 and executed across the required processors using a sample dataset 230. When the execution is complete, execution performance data from the run-time evaluator is recorded 250. Next, another strategy is selected 260 and if there are more strategies to test 270, steps 220 through 270 are performed on those strategies. If there are no more strategies to test 270, the strategy with the shortest execution time is selected 280 and the target program is then parallelized using the strategy with the shortest execution time 290.

The parallelization strategies (not shown in the figures) analyze the object code to determine methods of properly utilizing multiple parallel processors. A first strategy looks for loops within the source code with a large number of iterations, whereby the loops can be subdivided across the available processors. For example, if a particular loop is performed for one million iterations and there are 10 processing elements available, the loop is duplicated on each of the 10 processing elements and each processing element handles 100,000 iterations, thereby increasing performance ten-fold in theory. Of course, hardware dependent factors will determine the actual increase in performance. Another source code strategy looks for linear searches of lengthy data structures. In this strategy, the search code is distributed across the available processing elements and each processing element is provided a random starting point (seed) for its search, thereby, probabilistically, one processor will quickly find the target of the search. Another strategy includes detecting two or more processing stages which are then distributed across the available processing elements, whereby data is then passed from an input processing element to the stage-one processing element to the stage-two processing element and so on until the last stage processing element produces the final output. This strategy exploits parallelism through pipelining. It is based upon the assumption that if a procedure is repeated n or more times, then the n pipeline stages will speed the procedure by n times. This type of parallelism will be combined with the data input models described later.

Referring to FIG. 3a-d in conjunction with FIG. 4, the flow of the data analysis of the first embodiment of the present invention is shown. In this stage of the Veil system, the data is analyzed to determine the optimal division of the application over the available processing elements. The data analysis 300 begins with determining if the data is a single, contiguous data set 310, such as a long file. If it is, flow continues to divide the program accordingly 350 (see FIG. 3b). If not, it is determined if the data comes in bursts 320. If it does, flow continues to divide the program accordingly 360 (see FIG. 3c). If not, it is determined if the data comes as one continuous data stream 330. If it does come as a continuous stream, flow continues to divide the program optimally for a continuous data stream 370 (see FIG. 3d). If not, it has been determined that parallelization based upon data analysis cannot be performed 340 and this stage of the analysis is complete.

Figure 3A:
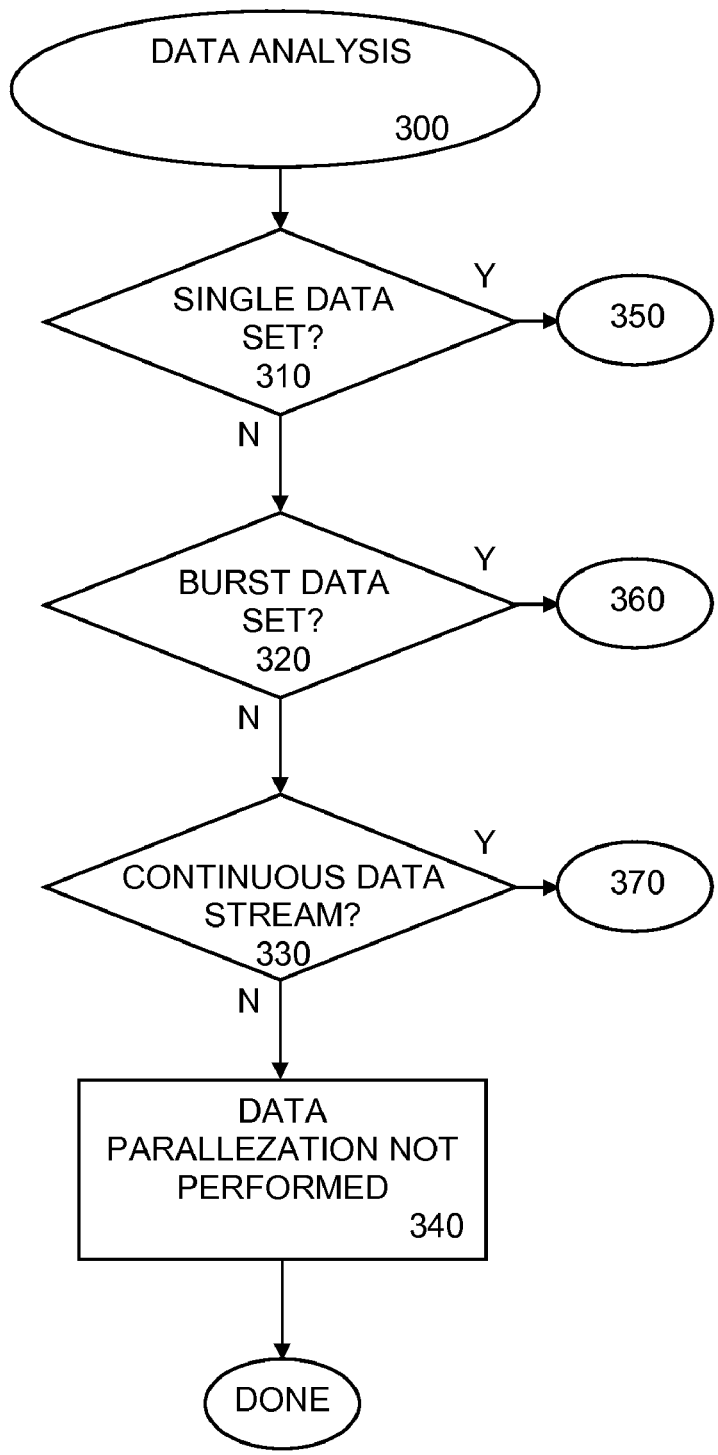
FIG. 3*a-d* illustrates a flow chart of the data analysis of the present invention.
Figure 3B:
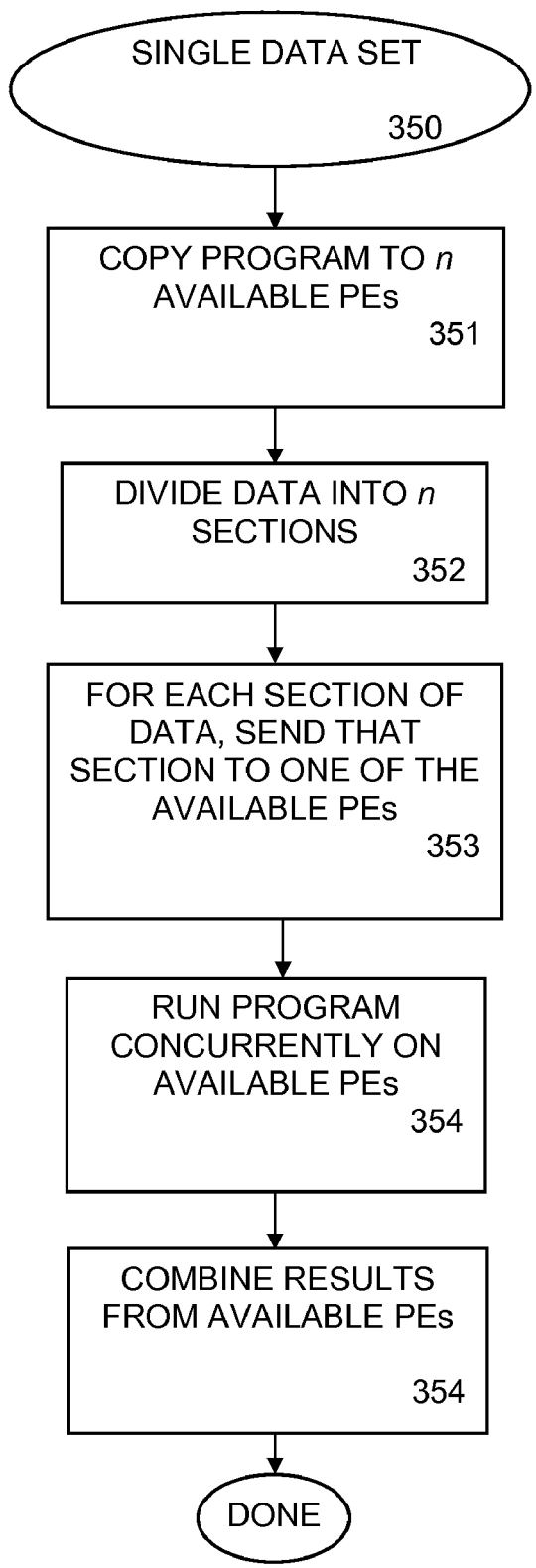

Referring now to FIG. 3b, the data has been analyzed and it has been determined that the data is a single data set 350. In this case, the Veil system copies the program or data processing sections of the program onto the available processing elements 351. In some embodiments, the number of available processors, n, is obtained from a profile (shown in FIG. 6). Next, the data is divided into n sections 352. For example, if the data is 10 MB and there are 10 processing elements (n=10), then the program is copied onto the 10 processing elements and the data is divided into 10 sections. Next, for each section of data, send that section of data to one of the available processing elements 353. This can be done in many ways known in the art. For example, each program on each processor is passed a file pointer to the file and a unique offset (in the example above, the first processing element would be passed an offset of 0, the second an offset of 1,000,000, and so on). Alternately, the data is divided into n separate files and a file pointer to the first file passed to the first processing element, a file pointer to the second file passed to the second processing element, and so on. There are other ways to communicate files and sections of files as known in the art.

Next, the program on each processing element is run concurrently on each processing element 354, each operating on its section of the data set. Once all processing elements complete their operation upon the data, the results are combined 354.

Figure 3C:
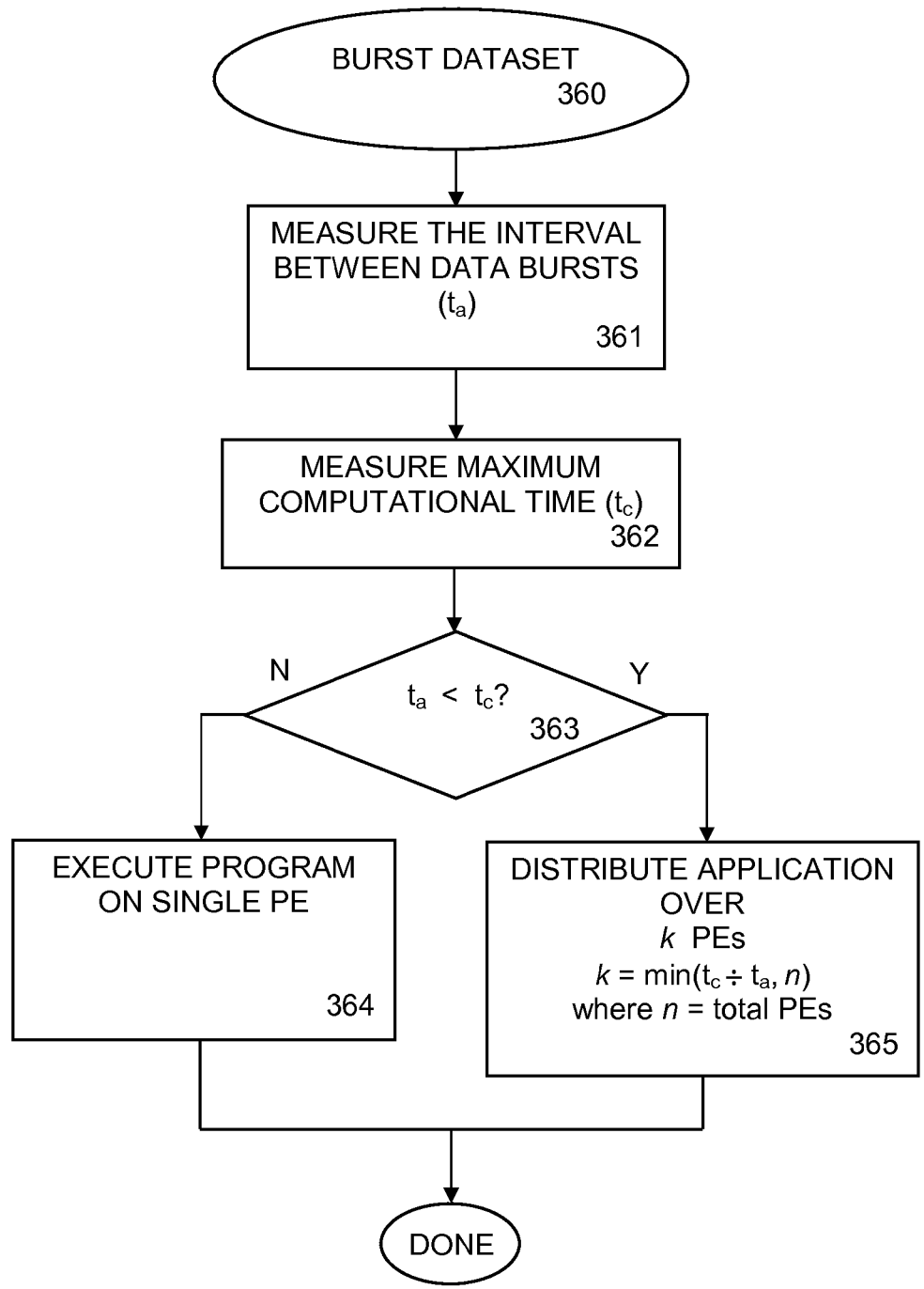
Figure 4A:
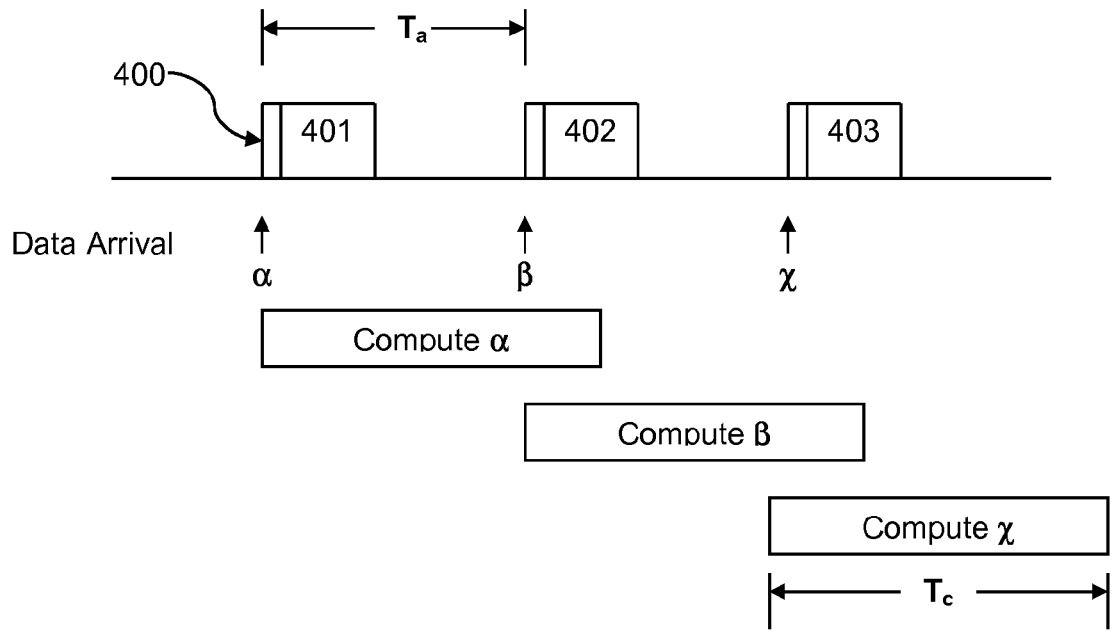
FIG. 4 illustrates a timing chart of the data analysis of the present invention.
Figure 4B:
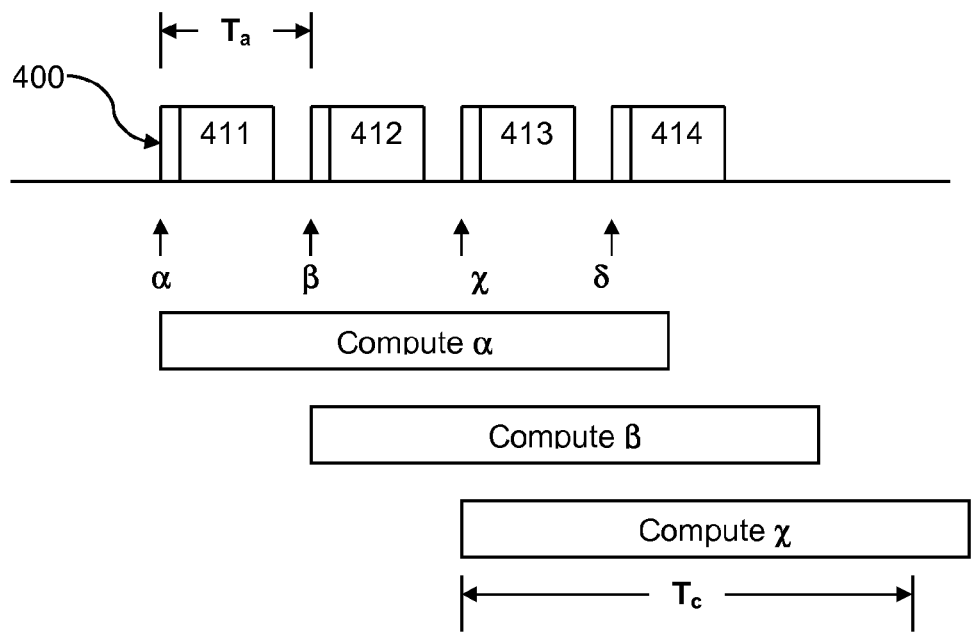

Referring now to FIGS. 3c, 4a and 4b, the data has been analyzed and it has been determined that the data is a burst data set 360. In this case, the Veil system measures the interval between data bursts, $t_a$ 361 and runs the program with a typical input to measure its computational time $t_c$ 362. If the inter-arrival time $t_a$ is less than the computational time $t_c$ 363, the Veil system copies the program or data processing sections of the program onto some number, k, of available processing elements 365. This number of processing elements, k, is a number between 2 and the total available processing elements n. In some embodiments, the number of available processing elements, n, is obtained from a profile (shown in FIG. 6). The number of processing elements used, k, is first determined by dividing the computational $t_c$ time by the inter-arrival time $t_a$ and rounding up to the next whole number. If the resulting value of k is greater than n, then the system will not be able to perform in real-time and k will be set to the value of n. FIG. 4a shows an example of burst data. The inter-arrival time $t_a$ is the time difference between the earliest arrival times 400 of two successive data bursts 401/402. The compute time $t_c$ is the processing time required to process the a data burst on a single processing element. In the example of FIG. 4a, the compute time $t_c$ is slightly longer than the inter-arrival time $t_a$. Therefore, if only one processing element was used, it would not be finished processing the first data burst 401 when the second data burst 402 arrives but would be finished when the third burst 403 arrives. In this example, if we assume the inter-arrival time $t_a$ is 5 seconds and the compute time $t_c$ is 7 seconds, we set k to 7/5, rounded up to k=2. Therefore, if two processing elements are used, the data bursts can be processed in real time. In this example, the first processing element would process the first burst 401, the second processing element would process the second burst 402 and the first processing element would be finished processing the first burst 401 and be ready to process the third burst 403 when it arrives.

FIG. 4b shows another example of burst data that arrives faster than that of FIG. 4a. The inter-arrival time $t_a$ is again the time difference between the earliest arrival times 400 of two successive data bursts 411/412. The compute time $t_c$ is the processing time required to process the a data burst on a single processing element. In the example of FIG. 4b, the compute time $t_c$ is much longer than the inter-arrival time $t_a$. Therefore, if only one processing elements was used, it would not be finished processing the first data burst 411 when the second data burst 412 arrives, or for that matter, when the third data burst 413 and fourth data burst 414 arrives. In this example, if we assume the inter-arrival time $t_a$ is 5 seconds and the compute time $t_c$ is 17 seconds, we set k to 17/5, rounded up to k=4. Therefore, if four processing elements are available and are used, the data bursts can be processed in real time. In this example, the first processing element would process the first burst 411, the second processing element process the second burst 412, the third processing element would process the third burst 413 and the fourth processing element would process the fourth burst 414. By the time the next data burst arrives (not shown), the first processing element would be finished processing the first data burst 411 and be ready to process the fifth data burst, and so on. Referring back to FIG. 3c, if the inter-arrival time $t_a$ is greater than the computational time $t_c$, then a single processing element is capable of processing each data burst before the next data burst arrives and only one processing element need be used (k=1). If additional processing elements are available, they are allocated to a pool of processing element groups arranged into a hierarchy, called sub-groups. In this case, work allocated to an individual processing element is shared with members from the sub-group.

Figure 3D:
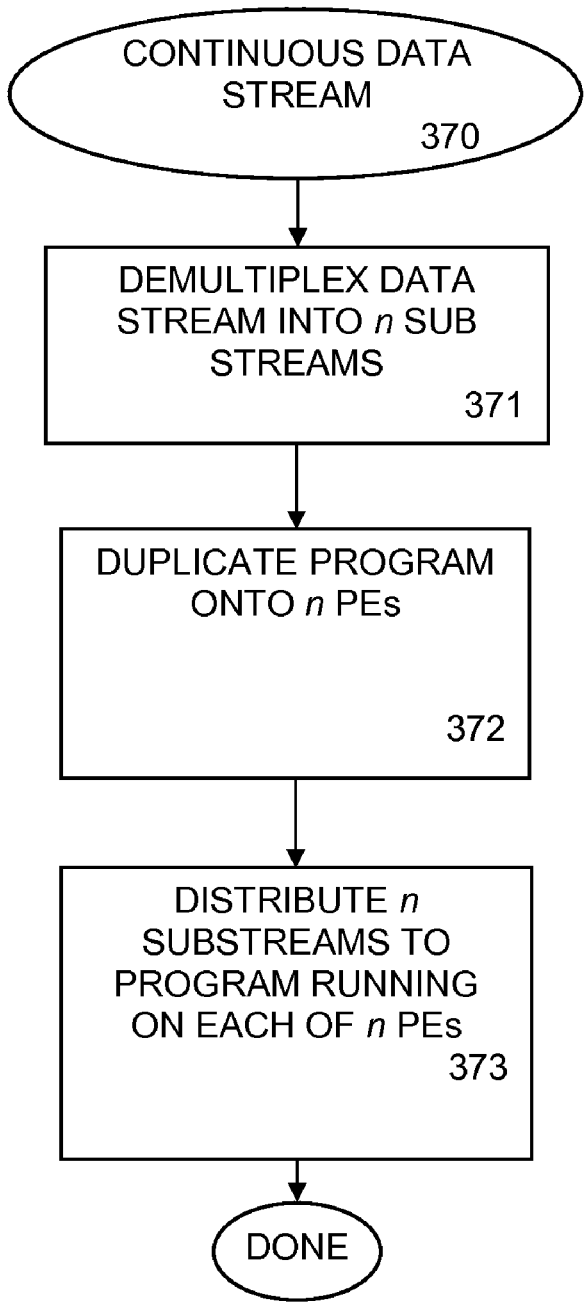

Referring now to FIG. 3d, the data has been analyzed and it has been determined that the data is a continuous stream 370. In this case, the Veil system demultiplexes the data into n sub streams, one for each available processing element. In some embodiments, the number of available processing elements, n, is obtained from a profile (shown in FIG. 6). Next, the program is duplicated onto n processing elements 372 and the n sub-streams are distributed, one to each of the n processing elements 373.

Figure 5:
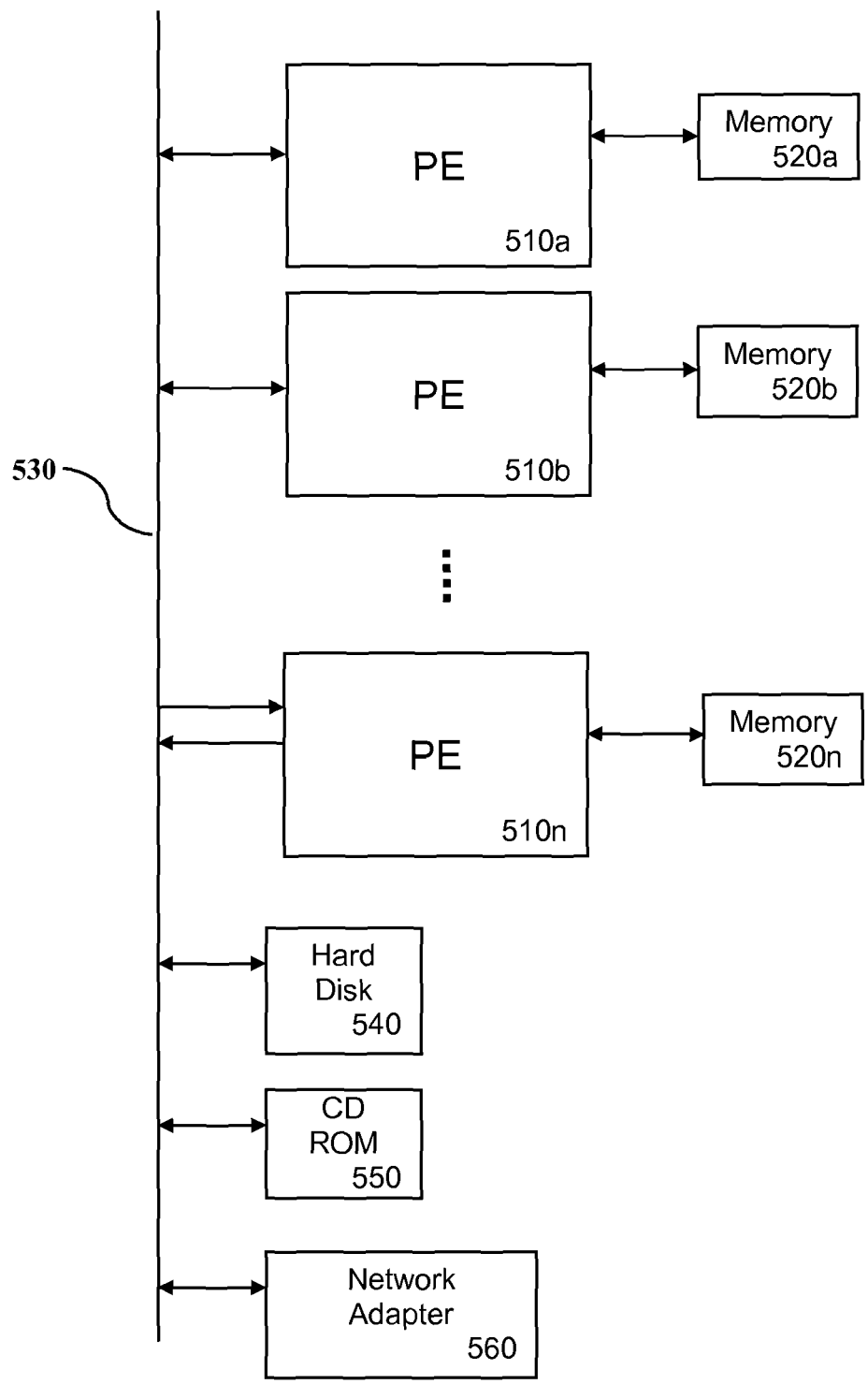
FIG. 5 illustrates a typical computing environment of all embodiments of the present invention.

Referring to FIG. 5, a schematic block diagram of a computer-based system of the present invention is shown. There are many architectures of computer systems, many having multi-processing elements or cores. In the example of FIG. 5, multiple processing elements (e.g. discrete processors) 510a-n are coupled and share a common bus 530. For example, each processing element 510a-n is an Intel Pentium processor. In this, each processors 510a-n is a processing element and accesses stored programs that are often stored within local memories 520a-n. The processors 510a-n can be any processor, perhaps an Intel Pentium-5® CPU or the like. The local memories 520a-n are connected to the processors and are any memories suitable for connection with the selected processor 510a-n, such as SRAM, DRAM, SDRAM, RDRAM, DDR, DDR-2, etc.

The processing elements 510a-n are connected to each other and communicate over a system bus 530. Peripheral devices such as a hard disk 540, a CDROM 550 and a network adapter 560 interface with one or more of the processors 510a-n over the system bus 530. Not shown are other input output devices such as displays, keyboard, mice and the like which may be connected to one particular processing elements 510a-n or to the system bus 530. It is also possible that an additional shared memory unit is attached to the system bus 530. It is further possible that the processing elements 510a-n share a common memory and communicate with each through the shared memory, possibly using semaphores within the shared memory to synchronize operations. The construction of a multi-processing element computing system is well known in the industry and the system shown in FIG. 5 is only an example of one such architecture.

In general, the hard disk 540 may be used to store programs, executable code and data persistently while the CDROM 550 may be used to load the programs, executable code and data from removable media onto the hard disk 540. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, laser disk, etc.

Figures 6A, 6B:
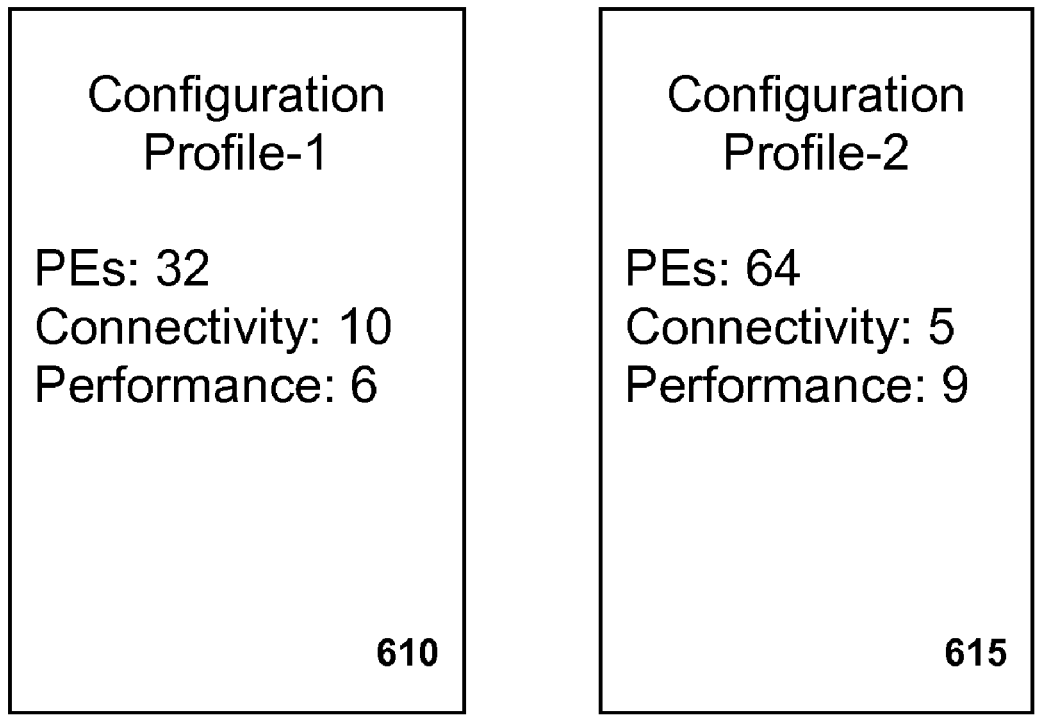
FIG. 6 illustrates a typical configuration profile of a multi-processor computing system of all embodiments of the present invention.

Referring to FIG. 6a and FIG. 6b, a typical profile is shown for two different parallel configurations. In FIG. 6a, a first configuration profile 610 is shown, declaring that there are 32 parallel processing elements with a connectivity score of 10 and a performance factor of 6. The number of processors, n, is used as previously discussed to determine a maximum of how many times the program is divided, in this case 32. In FIG. 6b, a second configuration profile 615 is shown, declaring that there are 64 parallel processing elements with a connectivity score of 5 and a performance factor of 9. The number of processors, n, is used as previously discussed to determine a maximum number of how many times the program is divided, in this case 32. The connectivity number is a relative number indicating how well the processors are connected to the system. If all processors are connected by shared memory, this number is higher (e.g., 10). If the processors are connected on a high speed data bus, this number is somewhat less, for example 7. If the processors are coupled by a network such as Ethernet (10 Megabit), this number will be low, for example 1. The performance number is a relative number indicating how fast each individual processor operates. For example, if each processor is an Intel Pentium IV® running at a 3.4 GHz clock speed, the performance number is, for example, 10. If each processor is an Intel Pentium II® running at a 133 MHz clock speed, the performance number is, for example, 2. The connectivity number and the performance number are used in some embodiments to optimize the division of a program across the available processors. For example, given a configuration of profile-1 610, optimizations are made favoring large amounts of data being transferred between processors, while in a configuration of profile-2 615, the performance cost of transferring large amounts of data between processors dictates that dividing the program needs to be divided to minimize the amount of data transferred between processors.

Figure 7:
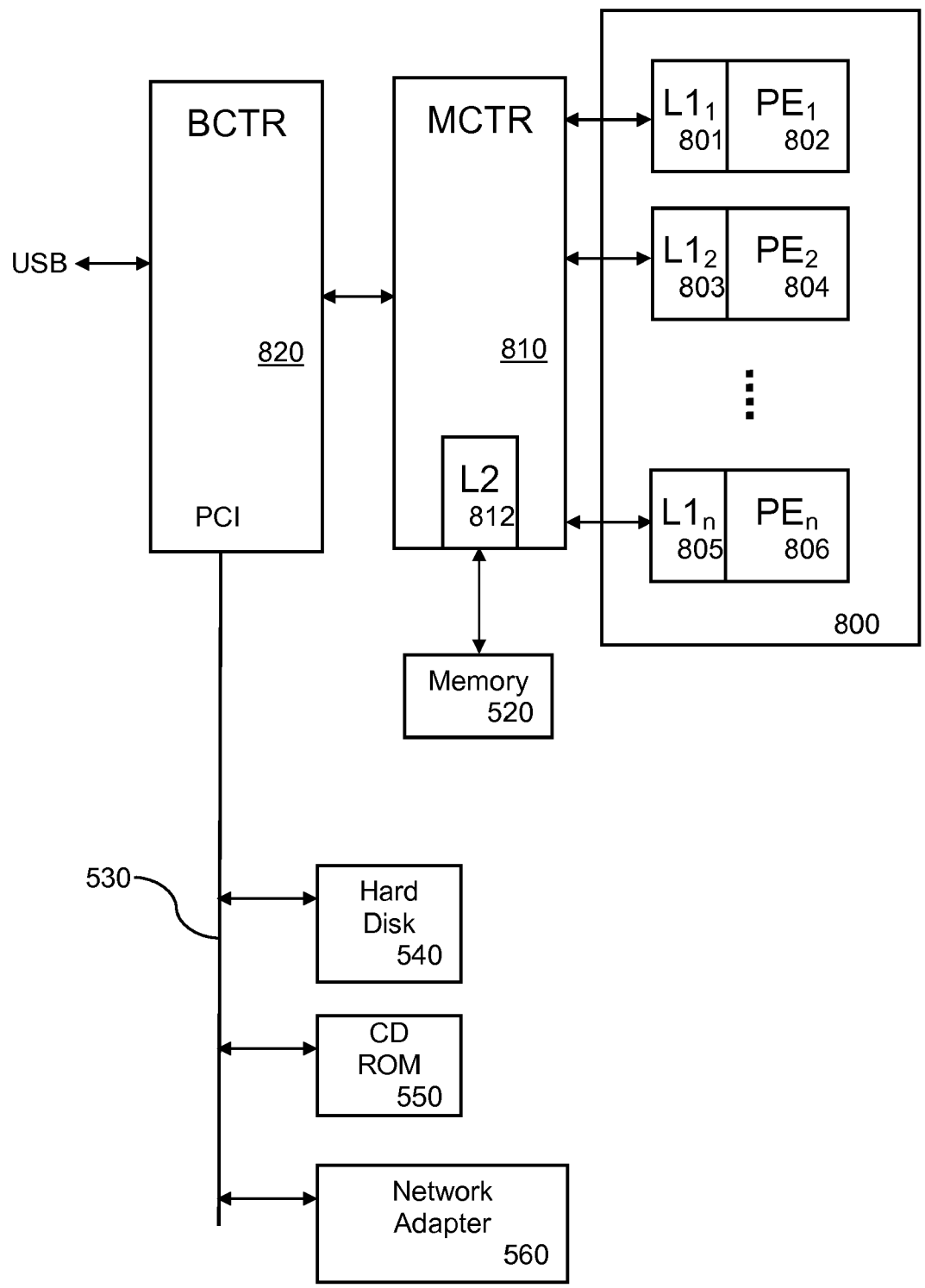
FIG. 7 illustrates another typical computing environment of all embodiments of the present invention.

Referring to FIG. 7, a schematic block diagram of a second computer-based system of the present invention is shown. There are many architectures of computer systems, many having multi-processing elements or cores. In the example of FIG. 5, multiple processing elements 802/804/806 are included within a single processor 800. For example, each processing element 802/804/806 is a core of a multi-core processor 800 such as an Intel Xenon processor or an AMD Turion 64 dual-core processor. In this, each processing element 802/804/806 accesses stored programs that are often stored within a shared memory 520. The main memory 520 is connected to the processor 800 (processing elements 802/804/806) through a memory controller 810 and is any memory suitable for connection with the processor 800, such as SRAM, DRAM, SDRAM, RDRAM, DDR, DDR-2, etc. In most multi-core processors 800, each processing element has its own level-1 (L1) cache 801/803/805 and the main memory 520 has a level-2 (L2) cache 812.

The processing elements 802/804/806 are connected to each other and communicate through the memory controller 810 or other means (not shown) as known in the art. Peripheral devices such as a hard disk 540, a CDROM 550 and a network adapter 560 interface with the processor 800 through a bus controller 820 and the system bus 530. Not shown are other input output devices such as displays, keyboard, mice and the like which to the system bus 530 or directly to the bus controller 820 (e.g. Universal Serial Bus—USB). It is further anticipated that the processing elements 803/805/807 share a common memory and communicate with each through the shared memory, possibly using semaphores within the shared memory to synchronize operations. The construction of a multi-core processing systems is well known in the industry and the system shown in FIG. 7 is only an example of one such architecture.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system that automatically decomposes an existing sequential program into one or more distributed programs that execute on multiple-processing elements of a computing system, the decomposition being performed without the knowledge of a user, the system comprising:

a computer system comprising at least one processor and a plurality of processing elements;

a target program in object code form, the target program written to run on a single processing element computer system;

a plurality of strategies, the strategies including one or more of parallelization strategies and distribution strategies;

a program having coded therein a means for:
  (a) encapsulating the target program with a run-time analyzer;
  (b) selecting one of the strategies from the plurality of strategies;
  (c) parallelization and distributing the target program according to the selected one strategy;
  (d) executing the target program by one or more of the processing elements;
  (e) recording execution results of the target program; and
  (f) if there are further strategies in the plurality of strategies, changing the selected one strategy to a next strategy from the plurality of strategies and repeat steps a-f;
  (g) comparing the execution results and selecting a best parallelization strategy having a best performance-oriented result;
  (h) parallelizing the target application using the best parallelization strategy with the best performance-oriented result;
  (i) analyzing a target data on which the target program is designed to operate;
  (j) if the target data is a contiguous dataset then:
    determining a number of available processing elements;
    copying at least part of the target program onto the available processing elements;
    dividing the target data into a number of data segments, the data segments being of a fixed-size or a variable size;
    executing the at least part of the target program on the available processing elements, each operating upon one of the data segments;
    combining the results from the available processing elements;

(k) if the target data is burst data then:
  measuring an interval between bursts;
  measuring a computation time of the target program;
  if the interval between bursts is less than the computation time then determining the number of the available processing elements and distributing at least part of the target program over the available processing elements;
  if the interval between bursts is not less than the computation time then executing the program on one of the available processing elements;
(l) if the target data is a continuous data stream then:
  determining the number of the available processing elements;
  duplicating at least part of the target program onto the available processing elements; and
  demultiplex the target data into the number of sub-streams, where the number of sub-streams matches the number of the available processing elements.

2. The system of claim 1, wherein the plurality of strategies are selected from the group consisting of detecting program iteration, detecting recursion, detecting a locality of memory reference, detecting regularity of memory references, and processor heterogeneity.

3. The system of claim 1, wherein the run-time analyzer measures/reads and records statistics related to the group consisting of virtual memory paging load, swapped memory load, network load, input/output device load, run queue length for each processing element, runtime profiles of other processes and types of input/output operations requested by the target program.

4. The system of claim 1, wherein the run-time analyzer reads and records operating system data selected from the group consisting of amount of free storage space, storage read/write speed, file protections, file creation limits, and files accessed by the target program.

5. The system of claim 1, wherein the run-time analyzer is records input/output read/write patterns requested by the target program.

6. A computer implemented method for decomposing and distributing a target program onto a plurality of processing elements without user intervention, the target program being sequential, the method comprising:
  (a) encapsulating the target program with a run-time analyzer;
  (b) selecting one strategy from a plurality of strategies, the strategies being performance oriented parallelization/distribution strategies;
  (c) decomposing and distributing the target program according to the one strategy;
  (d) executing the target program with the run-time analyzer on at least two of the plurality of processing elements;
  (e) recording execution results of the target program;
  (f) if there are further strategies in the plurality of strategies, changing the one strategy to a next strategy from the plurality of strategies and repeating steps a-f;
  (i) analyzing a target data on which the target program is designed to operate;
  (j) if the target data is a contiguous dataset then:
    determining a number of available processing elements;
    copying at least part of the target program onto the available processing elements;
    dividing the target data into a number of data segments;
    running the at least part of the target program on the available processing elements, each of the available processing elements operating upon one of the data segments;
    combining the results from the available processing elements;
  (k) if the target data is burst data then:
    measuring an interval between bursts;
    measuring a computational time of the target program;
    if the interval between bursts is less than the computational time then determining the number of the available processing elements and distributing the at least part of the target program over the number of available processing elements;
    if the interval between bursts is not less than the computational time then executing the program on one available processing elements;
  (l) if the target data is a continuous data stream then:
    determining the number of available processing elements;
    duplicating the at least part of the target program onto the available processing elements; and
    demultiplexing the target data into a number of sub-streams, where the number of sub-streams matches the number of available processing elements.

7. The computer implemented method of claim 6, wherein the plurality of strategies are selected from the group consisting of detecting program iteration, detecting recursion, detecting a locality of memory reference, detecting regularity of memory references, and processor heterogeneity.

8. The computer implemented method of claim 7, wherein the run-time analyzer implements the steps of reading and recording operating system data selected from the group consisting of amount of free storage space, storage read/write speed, file protections, file creation limits, and files accessed by the target program.

9. The computer implemented method of claim 6, wherein the run-time analyzer includes the steps of measuring/reading and recording statistics related to the group consisting of virtual memory paging load, swapped memory load, network load, input/output device load, run queue length for each processing element, runtime profiles of other processes and types of input/output operations requested by the target program.

10. The system of claim 6, further comprising:
  if there still remains unassigned processing elements, then allocating the unassigned processing elements to assist the assigned processing elements as a sub-group.

11. The system of claim 6, wherein the plurality of strategies includes results-oriented strategies that achieve improved performance using fewer than all of the processing elements.

12. A system for optimizing the operation of a program in a multiple-processing element computing system, the system comprising:
  (a) a computer system comprising at least one processor and a plurality of processing elements;
  (b) a sequential target program written to run on the computer system;
  (c) a means for encapsulating the target program with a means for analyzing run-time performance of the target program;
  (d) a means for selecting one strategy from a plurality of strategies;
  (e) a means for decomposing and parallelizing the target program according to the one strategy;
  (f) a means for executing the target program with the means for analyzing on one or more of the processing elements;
  (g) a means for recording execution results of the target program; and (h) if there are further strategies in the plurality of strategies, a means for changing the one strategy to a next strategy from the plurality of strategies and repeat steps c-h;
(i) a means for comparing the execution results and for selecting a best strategy having a best execution time;
(j) a means for decomposing and parallelizing the target application using the best strategy;
(k) a means for analyzing a target data on which the target program is designed to operate;
(l) if the target data is a contiguous dataset then:
 a means for determining a number of available processing elements;
 a means for copying at least part of the target program onto the available processing elements;
 a means for dividing the target data into a number of data segments;
 a means for running the target program on the available processing elements, each processing elements operating upon one of the data segments;
 a means for combining the results from the available processing elements;
(m) if the target data is burst data then:
 a means for measuring an interval between bursts;
 a means for measuring a computational time of the target program;
 if the interval between bursts is less than the computational time then a means for determining the number of the available processing elements and a means for distributing the target program over the available processing elements;
 if the interval between bursts is not less than the computational time then a means for executing the program on one of the processing elements;
(n) if the target data is a continuous data stream then:
 a means for determining the number of available processing elements;
 a means for duplicating the at least part of the target program onto the available processing elements; and
 a means for demultiplexing the target data into a number of sub-streams, where the number of sub-streams matches the number of available processing elements.

13. The system of claim 12, wherein the plurality of strategies are selected from the group consisting of detecting program iteration, detecting recursion, detecting a locality of memory reference, detecting regularity of memory references, and processor heterogeneity.

14. The system of claim 13, wherein the run-time analyzer includes the steps of measuring/reading and recording statistics related to the group consisting of virtual memory paging load, swapped memory load, network load, input/output device load, run queue length for each processing element, runtime profiles of other processes and types of input/output operations requested by the target program.

15. The system of claim 12, wherein the run-time analyzer implements the steps of reading and recording operating system data selected from the group consisting of amount of free storage space, storage read/write speed, file protections, file creation limits, and files accessed by the target program.

16. The system of claim 12, further comprising:
 if there still remains unassigned processing element, then allocating the unassigned processing elements to assist the assigned processing elements as a sub-group.

17. The system of claim 12, wherein the plurality of strategies includes results-oriented strategies that achieve improved performance using fewer than all of the processing elements.

* * * * *